United States Patent
Chen et al.

(10) Patent No.: US 11,710,871 B2
(45) Date of Patent: Jul. 25, 2023

(54) END COVER ASSEMBLY, BATTERY CELL AND ELECTROLYTE INJECTION METHOD THEREFOR, BATTERY, AND POWER CONSUMPTION DEVICE

(71) Applicant: Contemporary Amperex Technology Co., Limited, Ningde (CN)

(72) Inventors: Xinxiang Chen, Ningde (CN); Yulian Zheng, Ningde (CN); Shoujun Huang, Ningde (CN); Peng Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/585,110

(22) Filed: Jan. 26, 2022

(65) Prior Publication Data
US 2022/0209340 A1    Jun. 30, 2022

Related U.S. Application Data

(63) Continuation of application No. PCT/CN2020/141325, filed on Dec. 30, 2020.

(51) Int. Cl.
*H01M 50/147* (2021.01)
*H01M 10/04* (2006.01)

(52) U.S. Cl.
CPC ..... *H01M 50/147* (2021.01); *H01M 10/0431* (2013.01); *Y02P 70/50* (2015.11)

(58) Field of Classification Search
CPC .. Y02P 70/50; H01M 50/147; H01M 10/0431
(Continued)

(56) References Cited

U.S. PATENT DOCUMENTS

2012/0107653 A1    5/2012  Guen et al.

FOREIGN PATENT DOCUMENTS

CN     107359304 A    11/2017
CN     110233214 A     9/2019
(Continued)

OTHER PUBLICATIONS

English language machine translation of "Automobile power battery cover plate production template" by Xu Jundong in CN210778694 (U)—Jun. 16, 2020 (Year: 2020).*

(Continued)

*Primary Examiner* — Jonathan G Jelsma
*Assistant Examiner* — Omar M Kekia
(74) *Attorney, Agent, or Firm* — Sterne, Kessler, Goldstein & Fox P.L.L.C.

(57) ABSTRACT

An end cover assembly, a battery cell and an electrolyte injection method therefor, a battery, and a power consumption device are provided. The end cover assembly may include an end cover provided with a through hole for injecting an electrolyte and an accommodating portion; a seal configured to seal the through hole; and a cover body covering at least part of the seal, the cover body including a limiting portion, the limiting portion being located within the accommodating portion to restrict the cover body from separating from the end cover, and the cover body being movable together with the seal by movement of the limiting portion relative to the accommodating portion, wherein when the cover body moves to a first position, the seal covers the through hole, and when the cover body moves to a second position, the seal avoids the through hole.

20 Claims, 14 Drawing Sheets

(58) Field of Classification Search
USPC .......................................................... 429/175
See application file for complete search history.

(56) References Cited

FOREIGN PATENT DOCUMENTS

| | | | | |
|---|---|---|---|---|
| CN | 210778694 | * | 6/2020 | ............ Y02E 60/10 |
| CN | 111933833 A | | 11/2020 | |
| CN | 212161870 U | | 12/2020 | |
| CN | 212161871 U | | 12/2020 | |
| JP | 2019-057421 A | | 4/2019 | |

OTHER PUBLICATIONS

Written Opinion of the International Searching Authority issued in International Application No. PCT/CN2020/141325, dated Sep. 28, 2021, 10 pages.

* cited by examiner

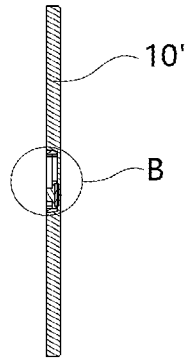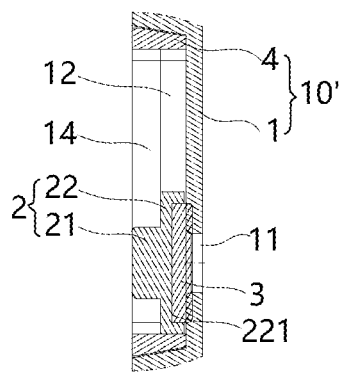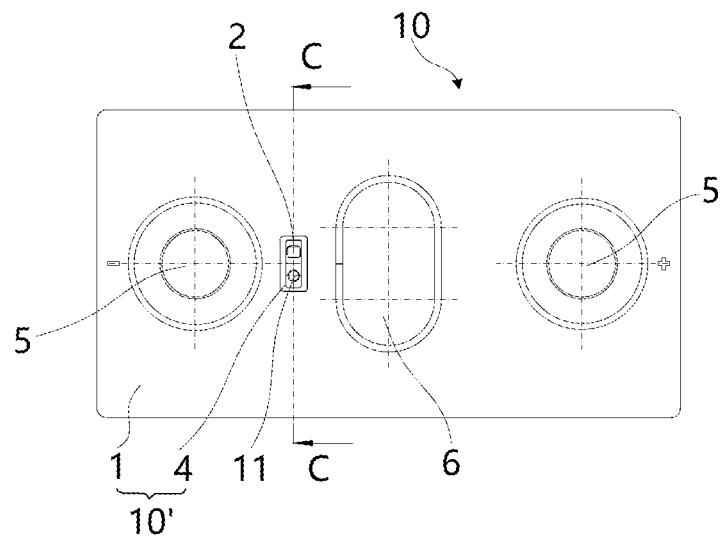
Fig. 5　　　　　Fig. 6
Fig. 7

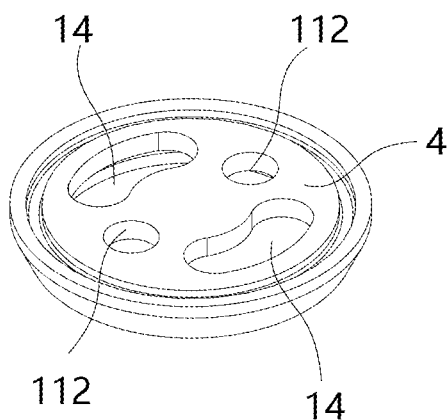
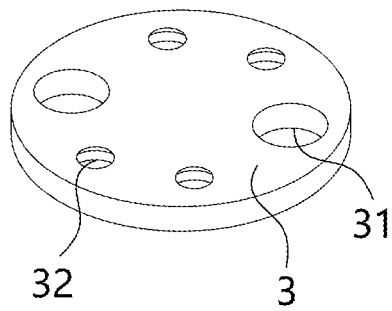
Fig. 18              Fig. 19
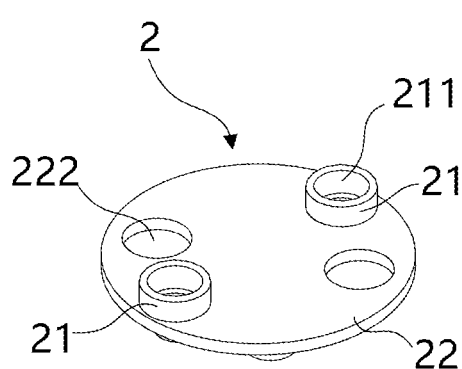
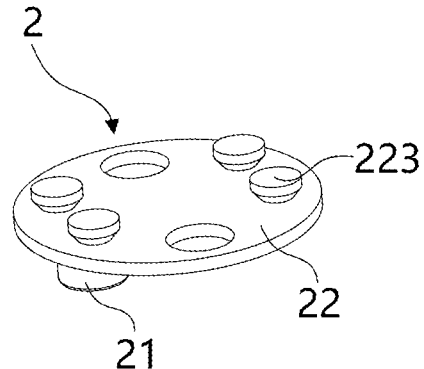
Fig. 20A             Fig. 20B
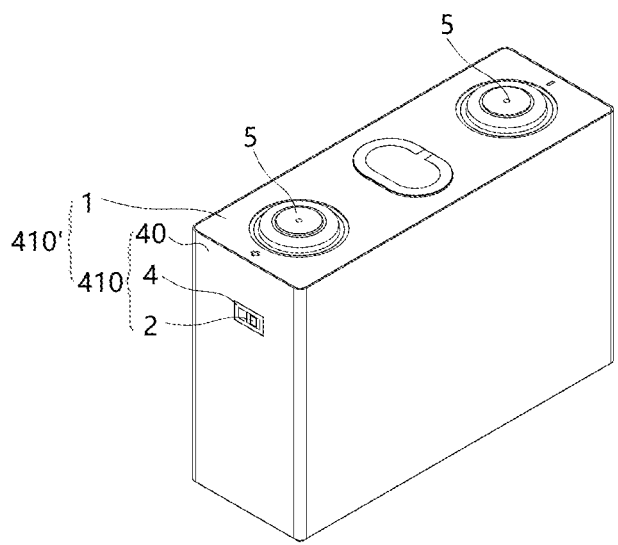
Fig. 21

END COVER ASSEMBLY, BATTERY CELL AND ELECTROLYTE INJECTION METHOD THEREFOR, BATTERY, AND POWER CONSUMPTION DEVICE

CROSS-REFERENCE TO RELATED APPLICATION

The present application is a continuation of International Application No. PCT/CN2020/141325 filed on Dec. 30, 2020, the disclosures of which are hereby incorporated in their entirety by reference.

TECHNICAL FIELD

The present disclosure relates to the field of battery technology, and in particular to an end cover assembly, a battery cell and an electrolyte injection method therefor, a battery, and a power consumption device.

BACKGROUND

With the advantages of high energy density, high power density, a long cycle life and long storage time, lithium-ion and other batteries have been commonly used in electric vehicles.

However, extending the battery life of electric vehicles has been a difficult problem in the industry.

SUMMARY

According to a first aspect of the present disclosure, an end cover assembly for a battery cell is provided, the end cover assembly including:

an end cover provided with a through hole for injecting an electrolyte and an accommodating portion;

a seal configured to seal the through hole; and a cover body covering at least part of the seal and being movable together with the seal, the cover body including a limiting portion, the limiting portion being located in the accommodating portion to restrict the cover body from separating from the end cover, and the cover body being configured to move relative to the end cover through the movement of the limiting portion in the accommodating portion;

wherein when the cover body moves to a first position, the seal covers the through hole; and when the cover body moves to a second position, the seal avoids the through hole.

In some embodiments, the first position and the second position are a first limit position and a second limit position, respectively, for the movement of the cover body in opposite directions.

In some embodiments, the end cover is provided with an opening communicated with the accommodating portion, and the cover body further includes an actuating portion connected to the limiting portion, the actuating portion being configured to move in the opening by receiving an external driving force.

In some embodiments, the actuating portion passes through the opening toward an outer side of the end cover in a thickness direction.

In some embodiments, two side walls of the accommodating portion along a direction of movement of the cover body are configured to provide guidance for the movement of the limiting portion; and/or two side walls of the opening along a direction of movement of the cover body are configured to provide guidance for the movement of the actuating portion.

In some embodiments, the first position and the second position are a first limit position and a second limit position, respectively, for the movement of the cover body in opposite directions;

two ends of the accommodating portion along a direction of movement of the cover body cooperate with the limiting portion to define the first limit position and the second limit position, respectively; and/or two ends of the opening along a direction of movement of the cover body cooperate with the actuating portion to define the first limit position and the second limit position, respectively.

In some embodiments, limiting structures are provided between a side wall of the opening and the actuating portion, the limiting structure being configured to limit the cover body to the first position.

In some embodiments, the limiting structures include:

a protruding portion, provided on a side wall of the opening along a direction of movement of the cover body; and a limiting opening, provided on a side wall of the actuating portion along the direction of movement of the cover body; wherein the protruding portion being configured to be snapped into the limiting openings when the cover body moves to the first position.

In some embodiments, the actuating portion is provided with a clamping groove configured to cooperate with an external component for applying the driving force, to drive the cover body to move.

In some embodiments, the accommodating portion includes a first limiting wall, a second limiting wall arranged opposite to the first limiting wall, and a first side wall configured to connect the first limiting wall and the second limiting wall.

In some embodiments, when the cover body is in a free state, the first limiting wall abuts against the limiting portion, and there is a clearance between the second limiting wall and the limiting portion.

In some embodiments, the end cover includes an end cover main body and a mounting component, the mounting component being provided on a surface of the end cover main body, and the through hole being arranged in the end cover and located in an area formed by enclosure of the mounting component, and the accommodating portion being formed by enclosure of the mounting component and the end cover main body.

In some embodiments, an outer surface of the end cover main body in a thickness direction is provided with a first groove, and the mounting component is fixed in the first groove.

In some embodiments, both the mounting component and the cover body are not higher than the first groove.

In some embodiments, the seal is fixed to the cover body; and/or the cover body is in contact with the seal, a coefficient of friction between contact surfaces of the seal and the cover body being greater than a coefficient of friction between contact surfaces of the seal and the end cover.

In some embodiments, a face of the limiting portion facing the seal is provided with a second groove, and at least part of the seal is located in the second groove.

In some embodiments, the cover body is configured to move in an extension direction of the accommodating portion to reach the first position and the second position.

In some embodiments, the accommodating portion extends along at least one of a length direction and a width direction of the end cover.

In some embodiments, the through hole is arranged off the center of the accommodating portion in the extension direction.

In some embodiments, the end cover includes an end cover main body and a mounting component, an outer surface of the end cover main body in the thickness direction being provided with a first groove, the mounting component being fixed in the first groove, and the through hole being arranged on a bottom wall of the first groove.

In some embodiments, the limiting portion is a rectangular block, and the accommodating portion forms a rectangular groove as a whole.

In some embodiments, the cover body is configured to rotate around a center of the accommodating portion to reach the first position and the second position.

In some embodiments, the through hole is arranged off the center of the accommodating portion.

In some embodiments, the end cover includes an end cover main body and a mounting component, an outer surface of the end cover main body in a thickness direction being provided with a first groove, the mounting component being fixed in the first groove;

the through hole includes a first through hole segment and a second through hole segment that are provided coaxially, the first through hole segment being formed on a bottom wall of the first groove and the second through hole segment being formed in the mounting component; and the seal is provided with a first avoidance hole, and the limiting portion is provided with a second avoidance hole, the first through hole segment being communicated with the second through hole segment through the first avoidance hole and the second avoidance hole when the cover body moves to the second position.

In some embodiments, the end cover is provided with an opening communicated with the accommodating portion, and the cover body further includes an actuating portion, the actuating portion being connected to the limiting portion and movable in the opening, and configured to receive an external driving force to cause the cover body to move; and at least two through holes are provided circumferentially of the accommodating portion, and the openings are located circumferentially between adjacent two through holes.

According to a second aspect of the present disclosure, a housing assembly is provided, including:

a housing provided with a through hole for injecting an electrolyte and an accommodating portion on a side wall of the housing;

a seal configured to seal the through hole; and a cover body configured to cover at least part of the seal and being movable together with the seal, the cover body including a limiting portion, the limiting portion being located in the accommodating portion to restrict the cover body from separating from the housing, and the cover body being configured to move relative to the housing by movement of the limiting portion relative to the accommodating portion;

wherein when the cover body moves to a first position, the seal covers the through hole; and when the cover body moves to a second position, the seal avoids the through hole.

According to a third aspect of the present disclosure, a battery cell is provided, including: an electrode assembly and a casing for accommodating the electrode assembly, the casing including a housing and the end cover assembly of the above embodiments, the housing having an end opening, and the end cover assembly covering the end opening of the housing; or an electrode assembly and a casing for accommodating the electrode assembly, the casing including an end cover main body and the housing assembly of the above embodiments, the housing having an end opening, and the end cover main body covering the end opening of the housing.

According to a fourth aspect of the present disclosure, a battery is provided, including a plurality of battery cells of the above embodiments.

According to a fifth aspect of the present disclosure, a power consumption device is provided, including the battery cell of the above embodiment, wherein the battery cell is configured to provide electrical energy.

According to a sixth aspect of the present disclosure, an electrolyte injection method for a battery cell is provided, including:

moving a cover body and a seal together to a second position so that the seal avoids a through hole in a casing of the battery cell;

injecting an electrolyte via the through hole; and moving the cover body and the seal together to a first position so that the seal covers the through hole, wherein during the movement of the cover body, a limiting portion of the cover body moves in an accommodating portion of the casing and restricts the cover body from separating from the casing.

According to a seventh aspect of the present disclosure, an electrolyte injection device for a battery cell is provided, including:

an electrolyte injection mechanism configured to inject an electrolyte into a casing of the battery cell via a through hole provided in the casing; and a cover body actuation mechanism configured to apply a driving force to a cover body so that the cover body and a seal move together to a first position to cover the through hole or the cover body and the seal move together to a second position to avoid the through hole, wherein during the movement of the cover body, a limiting portion of the cover body moves in an accommodating portion of the casing and restricts the cover body from separating from the casing.

BRIEF DESCRIPTION OF THE DRAWINGS

To describe technical solutions in the embodiments of the present disclosure more clearly, drawings to be used in the embodiments of the present disclosure will be introduced briefly below. Obviously, the drawings described below are merely some embodiments of the present disclosure, and those of ordinary skill in the art can obtain other drawings according to these drawings without creative work.

FIG. 5 is an A-A sectional view of FIG. 4;

FIG. 6 is an enlarged view at B of FIG. 5;

FIG. 7 is a top view of the end cover assembly shown in FIG. 2 in which the cover body moves to a second position;

FIG. 18 is a structural diagram of a mounting component in the end cover assembly shown in FIG. 15;

FIG. 19 is a structural diagram of a seal in the end cover assembly shown in FIG. 15;

FIGS. 20A and 20B are top and bottom structural diagrams of a cover body in the end cover assembly shown in FIG. 15, respectively;

FIG. 21 is a structural diagram of some embodiments of a casing of the battery cell in the present disclosure;

Figure 1A:
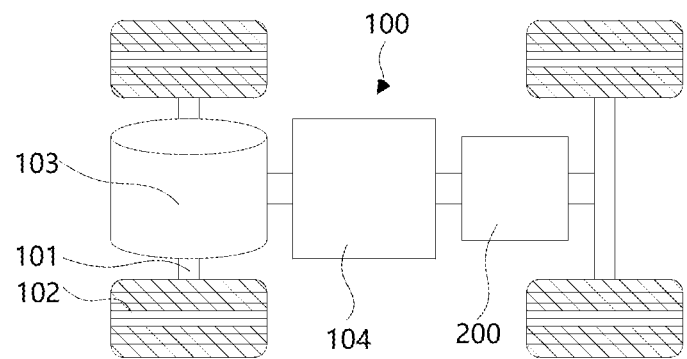
FIG. 1A is a structural diagram of some embodiments of a battery cell mounted in a vehicle in the present disclosure.

In the drawings, the figures are not drawn to the actual scale.

REFERENCE NUMERALS 100, vehicle; 200, battery; 300, battery module; 400, battery cell; 500, electrolyte injection device;

10, end cover assembly; 10', end cover; 20, adapter; 30, electrode assembly; 301, tab; 40, housing;

1, end cover main body; 11, through hole; 111, first through hole segment; 112, second through hole segment; 12, accommodating portion; 12A, first limiting wall; 12B, second limiting wall; 12C, first side wall; 13, guiding portion; 14, opening; 141, projection; 142, second side wall; 15, first groove;

2, cover body; 21, actuating portion; 21A, bump; 211, limiting opening; 212, clamping groove; 22, limiting portion; 221, second groove; 222, second avoidance hole; 223, inverted buckle;

3, seal; 31, first avoidance hole; 32, fixing hole;

4, mounting component; 41, mounting loop; 42, limiting table; 43, third groove;

5, terminal; 6, pressure relief component;

101, axle; 102, wheel; 103, motor; 104, controller;

201, first housing; 202, second housing;

410, housing assembly; 410', casing;

501, electrolyte injection mechanism; 502; cover body actuation mechanism.

DETAILED DESCRIPTION

Implementations of the present disclosure are further described in detail below in conjunction with the accompanying drawings and embodiments. The detailed description of the following embodiments and the accompanying drawings are used to illustrate the principles of the present disclosure exemplarily, but are not intended to limit the scope of the present disclosure, i.e., the present disclosure is not limited to the described embodiments.

In description of the present disclosure, it is to be noted that unless otherwise indicated, the meaning of "a plurality of" is two or more; and orientation or location relations denoted by the terms "upper", "lower", "left", "right", "inner", "outer", and the like are intended to facilitate describing the present disclosure and simplifying description, instead of indicating or implying the denoted devices or elements necessarily have specific orientations and are constructed and operated in specific orientations, and thus should not be construed as limiting the present disclosure. In addition, the terms "first", "second", "third", etc. are only used for description and are should not be construed as indicating or implying relative importance. The term "perpendicular" does not mean to be strictly perpendicular, but within an allowable error range. The term "parallel" does not mean to be strictly parallel, but within an allowable error range.

All orientation words appearing in the following description denote directions shown in the drawings and are not intended to limit specific structures in the present disclosure. In description of the present disclosure, it is also to be noted that unless otherwise explicitly specified and defined, the terms "installation", "connected" and "connection" should be construed broadly. For example, the terms may denote fixed connection, and may also denote detachable connection, or integrated connection; may denote direction connection, and may also denote indirect connection via an intermediate medium. For a person of ordinary skill in the art, specific meanings of the above-mentioned terms in the present disclosure may be construed according to specific circumstances.

To clearly describe orientations in the following embodiments, for example, a coordinate system in FIG. 1D defines directions of a battery cell 400, wherein an x direction denotes a length direction of the battery cell 400; a y direction is perpendicular to the x direction in a horizontal plane, and denotes a width direction of the battery cell 400; and a z direction is perpendicular to a plane formed by the x and y directions, and denotes a height direction of the battery cell 400. Based on such orientation definitions, the description of orientation or location relations denoted by the terms "upper", "lower", "top", "bottom", "front", "rear", "inner" and "outer" is only for the convenience of describing the present disclosure, rather than indicating or implying that the denoted devices necessarily have specific orientations and are constructed and operated in specific orientations, and thus should not be construed as limiting the protection scope of the present disclosure.

There are many factors related to the service life problem of lithium-ion battery cells. Over the years, those skilled in the art have attempted to solve the problem from many different aspects, but have not yet achieved expected results.

The inventors found, after numerous tests and verifications, that one of reasons for the battery life problem is that the battery goes through many charge and discharge cycles during use, so the electrolyte inside the battery cell is inevitably consumed irreversible by reactions, and the available capacity of the battery cell is reduced accordingly. Therefore, the inventors found that if the electrolyte inside the battery cell can be replenished during use of the battery cell, capacity reduction of the battery cell will be effectively slowed down and the service life of the battery cell will be improved.

A lithium-ion battery cell mainly consists of four parts: a positive electrode material, a negative electrode material, an electrolyte and a separator, wherein the electrolyte is an ionic conductor that has a conduction function between a positive electrode and a negative electrode of the battery cell, and generally consists of two components: an electrolyte lithium salt and an organic solvent. To prevent the electrolyte from seeping out and polluting the surrounding air and environment, or water vapor or metal particles from entering the interior of the battery cell and causing a short circuit of the positive and negative electrodes during use, there is a high requirement on the structural closure of the battery cell. In the related technology known to the inventors, electrolyte injection of battery cell is usually carried out at a manufacture stage, and after the electrolyte injection is completed, an electrolyte injection hole is usually closed by laser welding to ensure the sealing performance of the battery cell.

In such a battery cell, the electrolyte is difficult to replenish during use, and if electrolyte replenishment is to be carried out, a laser weld structure needs to be destroyed, which is difficult to seal again, and an irreversible damage is generated to the structure of the battery cell and affects the use performance of the battery cell.

In view of this, the present disclosure is intended to provide a battery cell, in which electrolyte replenishment can be implemented by changing the location of a closing component in an electrolyte injection member without destroying the structure of the battery cell, and an electrolyte injection hole is closed after the electrolyte replenishment is completed. However, considering structural characteristics and performance requirements of the lithium battery cell, many problems need to be solved in the design of the battery cell with an electrolyte injection member with such a function. For example:

1. As the overall volume of the lithium battery is small, and the remaining space on the end cover except for the terminals and an explosion-proof valve is limited, it is difficult to change the location of the closing component to achieve repeated electrolyte injection.

2. Due to the limited remaining space on the end cover of the lithium battery, and accordingly a small size of the electrolyte injection hole, and also a small volume of the enclosing component, if the location of the closing component is to be changed by an external operation, it needs to be convenient to operate to shorten the maintenance time.

3. The electrolyte injection member needs to have sufficient strength to prevent damage to the electrolyte injection member during the secondary electrolyte injection operation, and the structural strength of the electrolyte injection member needs to be improved when the electrolyte injection hole is closed by the same, so as to ensure the operation reliability and service life of the battery.

4. During the secondary electrolyte injection, external impurities or metal chips squeezed off from the battery need to be prevented from falling into the housing to cause a short circuit of the positive and negative electrodes of the electrode assembly.

5. In the case the battery is applied to a vehicle, which vibrates during operation, the electrolyte injection hole needs to be closed reliably by the electrolyte injection member, and the reliability and life of long-term use must be ensured.

Based on comprehensive consideration of the above technical problems, the present disclosure provides an end cover assembly, a battery cell, a battery and a power consumption device, which can conveniently achieve secondary electrolyte injection of a battery cell. That is, with an electrolyte injection hole formed therein, a process of injecting an electrolyte into the interior of the battery in an amount as needed includes primary and secondary electrolyte injection. The secondary electrolyte injection may also be referred to as replenishing electrolyte injection, further electrolyte injection, etc. The secondary electrolyte injection means a process of replenishing or changing the electrolyte, or adding or replenishing any solid, liquid or gas to the battery. Through convenient secondary electrolyte injection, the present disclosure can effectively slow down cell capacity reduction and improve the service life of the battery cell 400.

An object of the present disclosure is to provide a lithium-ion battery with improved performance.

The end cover assembly of the embodiments of the present disclosure can implement secondary electrolyte injection by changing the locations of the cover body and the seal. Through convenient secondary electrolyte injection, the present disclosure can effectively slow down cell capacity reduction and improve the service life of the battery cell. Moreover, in the secondary electrolyte injection, the cover body and the seal do not need to be removed from the end cover, thus omitting steps of removing and mounting the cover body and the seal during the secondary electrolyte injection, making it easier to operate, and this can avoid the loss of parts, improve the assembly efficiency of the battery cell during manufacture, and shorten the maintenance time during the secondary electrolyte injection.

The power consumption device includes a battery cell 400 configured to provide electrical energy to the device. The device may be a cell phone, a portable device, a laptop computer, a battery electric vehicle, an electric automobile, a ship, a spacecraft, an electric toy, an electric tool, etc. For example, the spacecraft includes an airplane, a rocket, a space shuttle, a spaceship, etc.; the electric toy includes a stationary or mobile electric toy, such as a game machine, an electric car toy, an electric ship toy, an electric airplane toy, etc.; and the electric tool includes a metal cutting electric tool, a grinding electric tool, an assembly electric tool, and a railway electric tool, such as an electric drill, an electric grinding machine, an electric wrench, an electric screwdriver, an electric hammer, an electric impact drill, a concrete vibrator, and an electric plane.

As shown in FIG. 1A, the power consumption device may be a vehicle 100, such as a new energy vehicle, which may be an all-electric vehicle, a hybrid electric vehicle, or a range-extended vehicle; or the power consumption device may also be an unmanned aerial vehicle or a ship. Specifically, the vehicle 100 may include an axle 101, wheels 102 connected to the axle 101, a motor 103, a controller 104, and a battery 200, wherein the motor 103 is configured to drive the axle 101 to rotate; the controller 104 is configured to control the operation of the motor 103; and the battery 200 includes a plurality of battery cells 400 to provide electrical energy for the operation of the motor 103 and other components in the vehicle. The battery cells 400 coverable of secondary electrolyte injection allow the device to reduce the replacement frequency of the battery cells and save costs, and improve the reliability and power performance of the operation of the device.

Figure 1B:
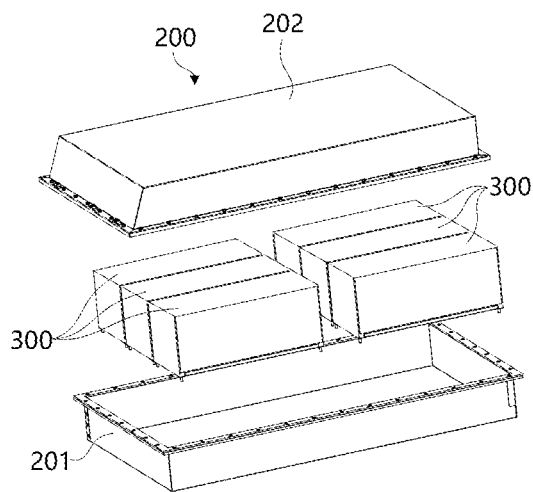
FIG. 1B is a structural diagram of some embodiments of a battery in the present disclosure.

To achieve a high power of the battery cells 400 to meet the use requirement, as shown in FIG. 1B, the battery 200 may be provided in the power consumption device. In some embodiments, the battery 200 includes a first housing 201 and a second housing 202 that are buckled to each other, wherein a plurality of battery cells 400, a battery module 300 formed by a plurality of battery cells 400 in groups, or a combination thereof may be arranged in the space formed by enclosure of the first housing 201 and the second housing 202.

Figure 1C:
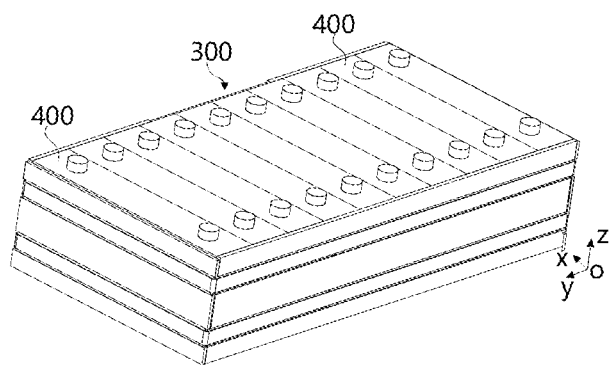
FIG. 1C is a structural diagram of some embodiments of a battery module in the present disclosure.

As shown in FIG. 1C, the battery module 300 includes a plurality of battery cells 400, and the plurality of battery cells 400 may be connected in series, in parallel, or in a series-parallel manner to achieve a large capacity or power. For example, as shown in FIG. 1C, the battery cells 400 may be placed upright, a height direction of the battery cells 400 being aligned with a vertical direction, and a plurality of battery cells 400 are provided side-by-side along a width direction thereof; or the battery cells 400 may be placed flat, the width direction of the battery cells 400 being aligned with the vertical direction, and a plurality of battery cells 400 may be stacked in at least one layer along the width direction, each layer including a plurality of battery cells 400 spaced along a length direction thereof.

To make the improvement points of the present disclosure apparent to those skilled in the art, an overall structure of the battery cell 400 is described first.

Figure 1D:
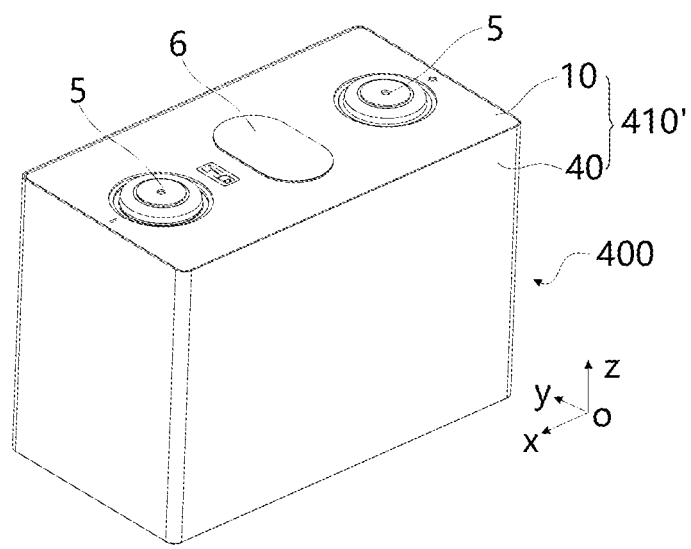
FIG. 1D is a structural diagram of some embodiments of a battery cell in the present disclosure.

As shown in FIG. 1D, the battery cell 400 includes a housing 40 and an end cover assembly 10, the end cover assembly 10 closing an open end of the housing 40.

Figure 1E:
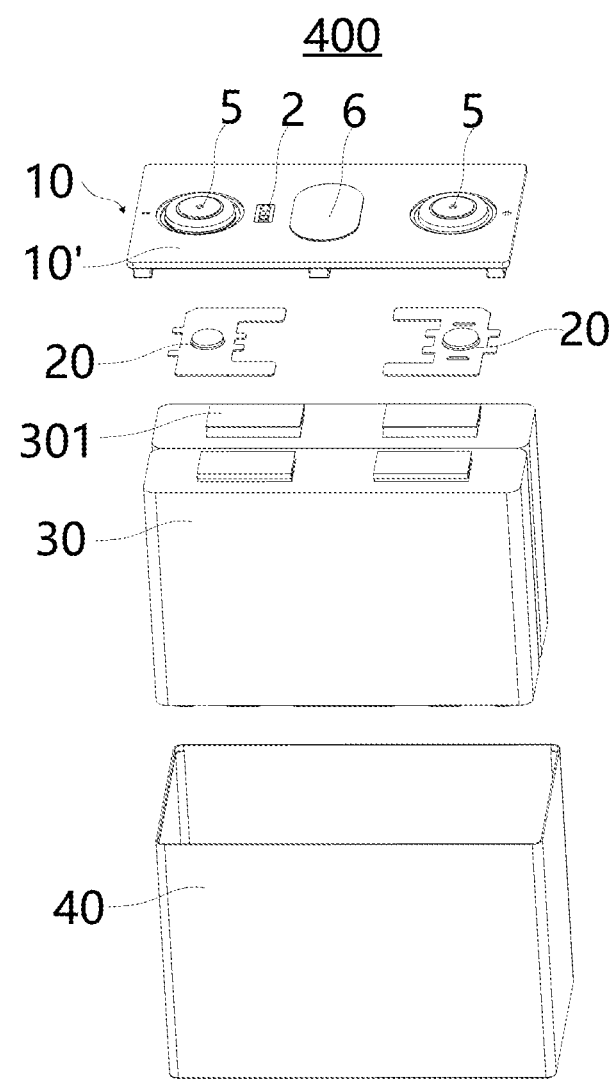
FIG. 1E is an exploded view of some embodiments of the battery cell in the present disclosure.

As shown in an exploded view of FIG. 1E, the battery cell 400 includes a housing 40, an electrode assembly 30, and an end cover assembly 10, the end cover assembly 10 being connected to the housing 40 to form a casing of the battery cell 400, the electrode assembly 30 being arranged in the housing 40, and the housing 40 being filled with an electrolyte. The battery cell 400 may be in a square, cylindrical or other shape. The end cover assembly 10 includes a pressure relief component 6, such as an explosion-proof valve, the pressure relief component 6 being configured to be actuated when the internal pressure of the battery cell 400 reaches a threshold to relieve the internal pressure of the battery cell 400.

Depending on the actual use requirement, a single or a plurality of electrode assemblies 30 may be provided. As shown in FIG. 1E, at least two independently wound electrode assemblies 30 may also be provided in the battery cell 400. A main body part of the electrode assembly 30 may be formed by winding or stacking together a first pole piece, a second pole piece, and a separator located between the first pole piece and the second pole piece, wherein the separator is an insulator between the first pole piece and the second pole piece. The main body part has two opposite end faces. In this embodiment, exemplary description is made with the first pole piece as a positive pole piece and the second pole piece as a negative pole piece. A positive active material is coated to a coated area of the positive pole piece, and a negative active material is coated to a coated area of the negative pole piece. A plurality of uncoated areas extending from coated areas of the main body part are laminated as tabs. The electrode assembly includes two tabs 301, a positive tab and a negative tab. The positive tab extends from the coated area of the positive pole piece, and the negative tab extends from the directions coated area of the negative pole piece.

The end cover assembly 10 is provided on the top of the electrode assembly 30, as shown in FIG. 1E, the end cover assembly 10 including an end cover 10' and two terminals 5, wherein the two terminals 5 are a positive terminal and a negative terminal, respectively, and each terminal 5 is provided with an adapter 20 correspondingly, the adapter 20 being located between an end cover main body 1 and the electrode assembly 30. For example, the tabs 301 of the electrode assembly 30 in FIG. 1E are located at the top; and the positive tab is connected to the positive terminal through one adapter 20, and the negative tab is connected to the negative terminal through the other adapter 20. Optionally, the battery cell 400 may include two end cover assemblies 10 arranged at two ends of the housing 40, receptively, with one terminal 5 being provided on each end cover assembly 10.

After the overall structure and application of the battery cell 400 are described, the improvement points of the present disclosure will be elaborated below. First, description is made by using an electrolyte injection member provided in the end cover assembly 10 as an example, based on which structure a number of embodiments are provided in the present disclosure.

In some embodiments, as shown in FIGS. 2 to 20B, the end cover assembly 10 for the battery cell 400 includes an end cover 10', a seal 3, and a cover body 2.

The end cover 10' is provided with a through hole 11 for injecting the electrolyte and an accommodating portion 12. The accommodating portion 12 may be a cavity, and the through hole 11 is located in an area enclosed by the accommodating portion 12. For example, the end cover 10' may be of a rectangular plate-like structure, and with the battery cell 400 as a reference, the through hole 11 may be provided in a height direction of the battery cell 400, i.e., provided in a thickness direction of the end cover 10', or may also be provided obliquely. The through hole 11 may be a round hole, an elliptical hole, a polygonal hole or a hole in any other shape.

The seal 3 is configured to seal the through hole 11. For example, the seal 3 may be made of a highly elastic material, preferably rubber or other elastic plastic, that is resistant to the electrolyte and has a flat, wear-resistant surface. The cover body 2 covers at least part of the seal 3, and the cover body 2 is movable together with the seal 3. The cover body 2 may be pressed against the seal 3, causing deformation of the seal 3 to improve a sealing effect, or just in contact with the seal 3 to limit its degree of freedom along the height direction. The cover body 2 may completely cover the seal 3 to apply pressure to the seal 3, limit the seal, or prevent external impurities from entering the battery; or the cover body 2 may partially cover the seal 3 in the case where the seal 3 can independently close the through hole 11.

The cover body 2 may include a limiting portion 22. The limiting portion 22 is located in the accommodating portion 12 to restrict the cover body 2 from separating from the end cover 10'. The cover body 2 is configured to move relative to the end cover 10' through the movement of the limiting portion 22 in the accommodating portion 12. For example, the cover body 2 is made of a high-strength metal that is not easy to deform, such as steel or aluminum.

When the cover body 2 moves to a first position, the seal 3 covers the through hole 11 to seal the electrolyte; and when the cover body 2 moves to a second position, the seal 3 avoids the through hole 11 to inject the electrolyte.

The present disclosure can implement switching between a state in which the through hole 11 is closed and a state in which the through hole 11 is open, by the movement of the seal 3 driven by the cover body 2, to achieve secondary electrolyte injection. Through convenient secondary electrolyte injection, the present disclosure can effectively slow down capacity reduction of the battery cell 400 and improve the service life of the battery. Further, when the cover body 2 moves to the second position, the through hole 11 communicates the interior of the housing 40 with the outside atmosphere, so that the gas inside the housing 40 or bubbles between the pole pieces can be discharged.

By discharging the bubbles between the pole pieces, the gap between the pole pieces is reduced, which can improve the cycling performance of the battery cell 400 and further improve the service life of the battery cell 400.

By discharging the gas inside the housing of the battery cell 400, the present disclosure can also release the pressure inside the housing 40, thereby reducing continuous force application by the gas inside the housing to the pressure relief component 6, and reducing the risk of a shortened life of the battery cell 400 due to electrolyte leakage or water vapor entering caused by creep rupture of the pressure relief component 6, thus further improving the service life of the cell; furthermore, it can reduce acting forces applied to other structures due to expansion of the battery cell 400 caused by a large amount of gas inside the battery cell 400, so as to avoid structural damage to the other structures due to an excessive expansion force of the battery cell 400, thus improving the service life of the battery.

By adopting a clamping structure between the limiting portion 22 and the accommodating portion 12, the clamping strength is easy to ensure, a simple structure is achieved, and the requirement on the fit precision is low; moreover, it can also prevent damage to the clamping structure in the case of a number of disassembling and assembling times. Moreover, in the case where the battery cell 400 is applied to a vehicle 100, as the vehicle 100 vibrates during operation, the present disclosure can prevent damage to the limiting portion 22 and the accommodating portion 12 due to long-term vibration by improving the clamping strength of the limiting portion 22 and the accommodating portion 12, thus ensuring the operation reliability and service life of the battery cell 400.

In the present disclosure, the cover body 2 causes the seal 3 to move and change its position to implement opening and closing of the through hole 11, so that the electrolyte injection structure is not damaged when the cover body 2 is opened, and the through hole 11 can also be closed reliably after the secondary electrolyte injection is completed, which can ensure the operation reliability of the battery after the secondary electrolyte injection. Therefore, the appearance of the battery cell 400 remains the same as before the electrolyte injection, and its use after the secondary electrolyte injection is not affected. Further, because the closure of the through hole 11 is achieved directly by moving the cover body 2, sealing of the through hole 11 by laser welding is not needed, thus omitting a step of cleaning the through hole 11 before laser welding and improving the manufacturing efficiency of the battery.

In addition, with respect to machining, the limiting portion 22 being provided on the cover body 2 and the accommodating portion 12 being provided on the end cover 10' are both easy for machining and suitable for lithium-ion batteries with small overall dimensions. With respect to assembly and maintenance, the secondary electrolyte injection can be achieved by only causing the seal 3 to move by the cover body 2, without removing the cover body 2 and the seal 3 from the end cover 10', thus omitting steps of removing and mounting the cover body 2 and the seal 3 during the secondary electrolyte injection, making it easier to operate, and this can avoid the loss of parts, improve the assembly efficiency of the battery cell 400 during manufacture, and shorten the maintenance time during the secondary electrolyte injection.

FIGS. 2 to 14 are structural diagrams of an end cover assembly 10 of a first embodiment of the present disclosure.

Figure 2:
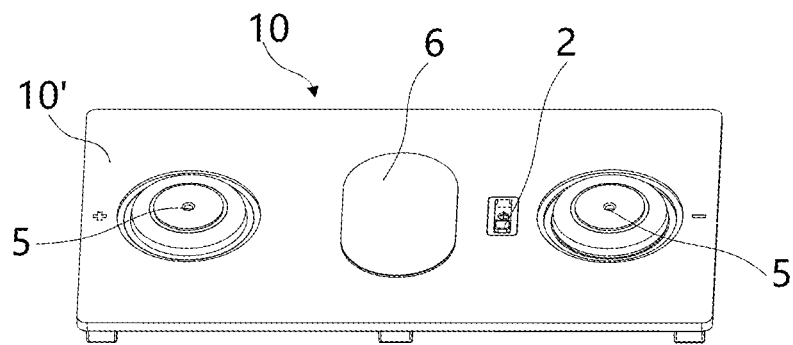
FIG. 2 is a structural diagram of a first embodiment of an end cover assembly in the battery cell in the present disclosure.
Figure 3:
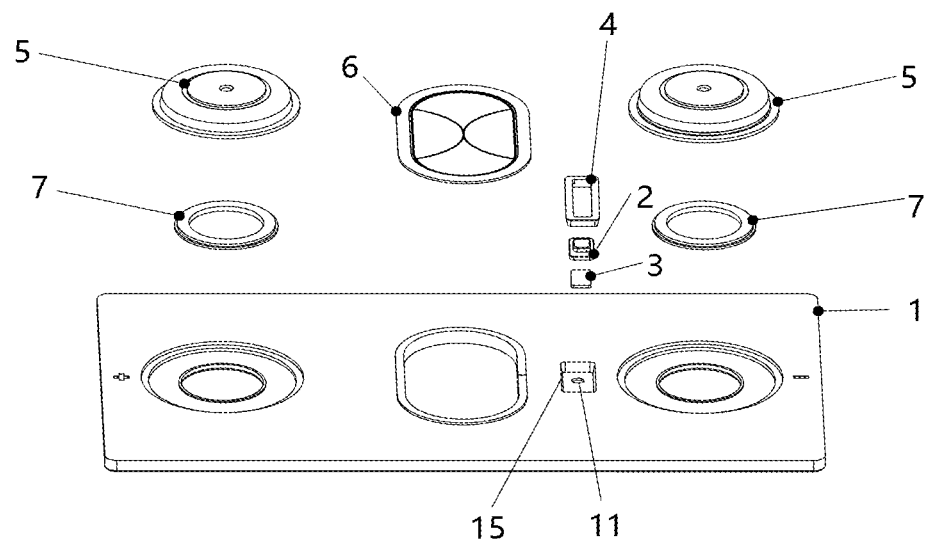
FIG. 3 is an exploded view of the end cover assembly shown in FIG. 2.

As shown in FIG. 2, the cover body 2 is configured to move in an extension direction of the accommodating portion 12 to reach the first position and the second position.

The opening or closing of the through hole 11 by pushing or pulling the cover body 2 in this embodiment facilitates applying a stable push or pull force, so that the cover body 2 and the seal 3 move smoothly; moreover, in the second position, the cover body 2 and the seal 3 as a whole leave the through hole 11, which is more convenient for electrolyte injection and can prevent the electrolyte from corroding the seal 3, thus improving the service life of the seal 3.

Depending on the position of the through hole 11, the accommodating portion 12 can extend along at least one of a length direction and a width direction of the end cover 10'.

Figure 4:
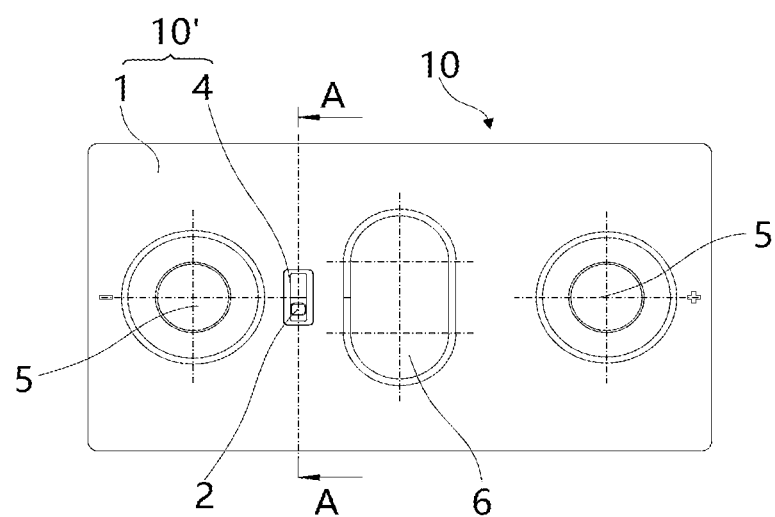
FIG. 4 shows a top view of the end cover assembly shown in FIG. 2 in which a cover body moves to a first position.
Figure 8:
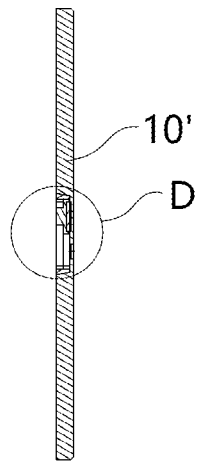
FIG. 8 is a C-C sectional view of FIG. 7.

As shown in FIGS. 4 to 6, the accommodating portion 12 extends along the width direction of the end cover 10', and in the length direction, the accommodating portion 12 may be located between the terminal 5 and the pressure relief component 6. Due to a small distance between the terminal 5 and the pressure relief component 6, the extension of the accommodating portion 12 along the width direction of the end cover 10' can ensure the structural strength of the end cover 10' in this area and prevent the end cover 10' from being deformed during the application of an external force to the cover body 2.

Optionally, the accommodating portion 12 may extend along the length direction of the end cover 10', or the accommodating portion 12 extends along an L-shape, or the accommodating portion 12 extends along a curve, such as a circular arc or circle, etc.

Optionally, a cross-section of the accommodating portion 12 is C-shaped or V-shaped.

In some embodiments, the first position and the second position are a first limit position and a second limit position, respectively, for the movement of the cover body 2 in opposite directions. Such a structure can reduce the extension length of the accommodating portion 12, thus ensuring the structural strength of the end cover 10'.

As shown in FIG. 4, when the cover body 2 is in the first position, which is the first limit position of the cover body 2 moving along the width direction of the end cover 10', the seal 3 completely covers the through hole 11 to close the through hole 11. As shown in FIG. 7, when the cover body 2 is in the second position, which is the second limit position of the cover body 2 moving along the width direction of the end cover 10', the seal 3 completely avoids the through hole 11 to open the through hole 11.

As shown in FIG. 7, the through hole 11 is arranged off the center of the accommodating portion 12 in the extension direction, and the through hole 11 is located in the moving path of the cover body 2. When the cover body 2 moves to two ends of the extension direction of the accommodating portion 12, respectively, the seal 3 completely covers the through hole 11 or completely avoids the through hole 11 to achieve the closing and opening of the through hole 11. Such a structure can reduce the extension length of the accommodating portion 12'.

As shown in FIG. 6, the end cover 10' is provided with an opening 14 communicated with the accommodating portion 12, and the opening 14 is communicated with the outer side of the end cover 10'; and the cover body 2 further includes an actuating portion 21 connected to the limiting portion 22, the actuating portion 21 being configured to move in the opening 14 by receiving an external driving force to drive the cover body 2 into motion.

With the actuating portion 21 in this embodiment, the external force can be applied conveniently to drive the cover body 2 into motion, and the applied external force can be more balanced so that the cover body 2 moves smoothly along the accommodating portion 12 to avoid clamping stagnation.

As shown in FIG. 6, the actuating portion 21 passes through the opening 14 toward an outer side of the end cover 10' in the thickness direction. Such configuration facilitates increasing the size of the actuating portion 21 to apply a more stable driving force to the cover body 2, so as not likely to be damaged after long-term use. Optionally, the opening 14 may also face toward the outer side of a side wall of the end cover 10', and accordingly, the actuating portion 21 passes through the opening 14 toward the outer side of the side wall of the end cover 10'.

Figure 12A:
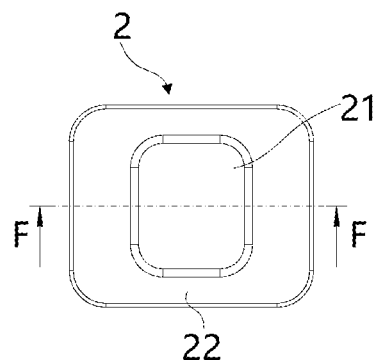
FIGS. 12A and 12B are a top view and an F-F sectional view of the cover body in the end cover assembly shown in FIG. 2, respectively.
Figure 12B:
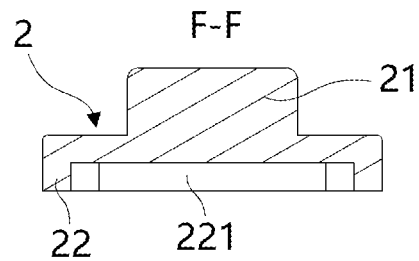
Figure 12C:
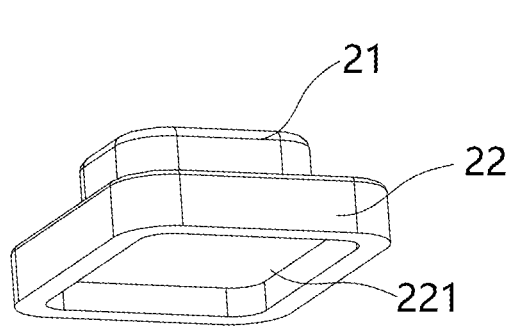
FIGS. 12C and 12D are structural diagrams of the cover body shown in FIG. 12A at a first viewing angle and a second viewing angle, respectively.

As shown in FIGS. 12A and 12B, when the cover body 2 is caused to move, a driving force may be applied to two side faces of the actuating portion 21 along a direction of movement of the cover body 2.

Figure 14:
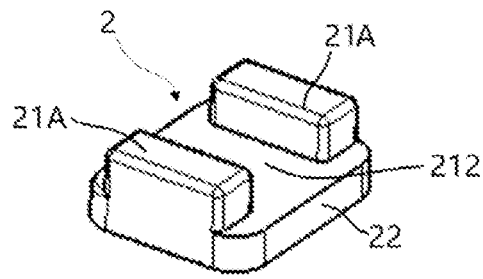
FIG. 14 is a structural diagram of a modification of the cover body in the end cover assembly shown in FIG. 2.

To facilitate the application of the driving force to the actuating portion 21, as shown in FIG. 14, the actuating portion 21 is provided with a clamping groove 212 configured to cooperate with an external component for applying the driving force, to drive the cover body 2 into motion. Such a structure facilitates embedding a tooling component into the clamping groove 212 to drive the cover body 2 into motion. Specifically, the actuating portion 21 includes two bumps 21A, and the two bumps 21A are located at two ends of the limiting portion 22 along the direction of movement of the cover body 2, with the clamping groove 212 being formed between the two bumps 21A.

Based on this, the first limit position and the second limit position may be defined in the following two modes.

Figure 9:
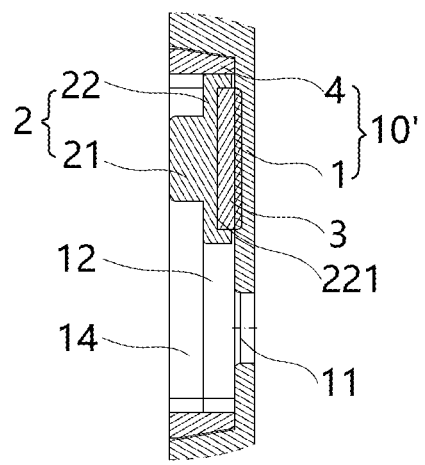
FIG. 9 is an enlarged view at D of FIG. 8.

In one mode, as shown in FIGS. 6 and 9, two ends of the accommodating portion 12 along the direction of movement of the cover body 2 cooperate with the limiting portion 22 to define the first limit position and the second limit position, respectively. Such a structure can limit the movement stroke of the cover body 2 by a simple structure, and enables the cover body 2 to reach the first position or the second position accurately; moreover, as the size of the limiting portion 22 is larger than that of the actuating portion 21, the limiting is easy to achieve.

For example, the accommodating portion 12 extends along the width direction of the end cover 10', and as shown in FIG. 6, when the cover body 2 moves to the first limit position, the limiting portion 22 abuts against an inner wall of one end of the accommodating portion 12 in the extension direction; and as shown in FIG. 9, when the cover body 2 moves to the second limit position, the limiting portion 22 abuts against an inner wall of the other end of the accommodating portion 12 in the extension direction. The accommodating portion 12 may be flush with end faces of the opening 14 in the extension direction, so the actuating portion 21 is still at a distance from an end wall of the opening 14 when the limiting portion 22 abuts against an end wall of the accommodating portion 12.

In the other mode, not shown in the figures, two ends of the opening 14 along the direction of movement of the cover body 2 cooperate with the actuating portion 21 to define the first limit position and the second limit position, respectively.

Figure 11A:
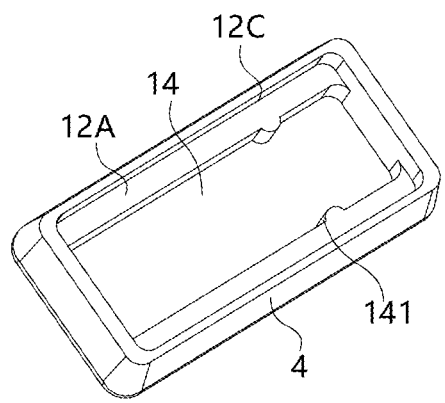
FIGS. 11A and 11B are schematic diagrams of two structures of a mounting component in the end cover assembly shown in FIG. 2, respectively.
Figure 11B:
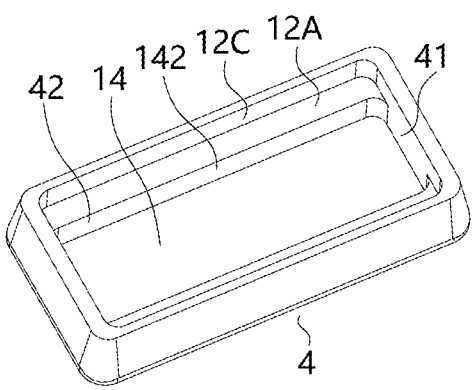
Figure 11C:
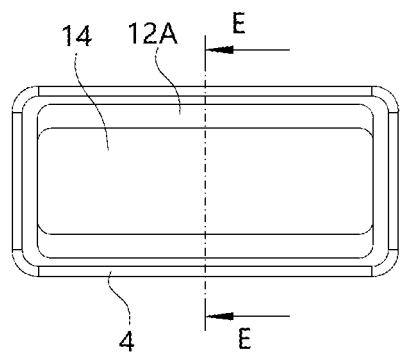
FIGS. 11C and 11D are a top view and an E-E sectional view of the mounting component shown in 11A, respectively.
Figure 11D:
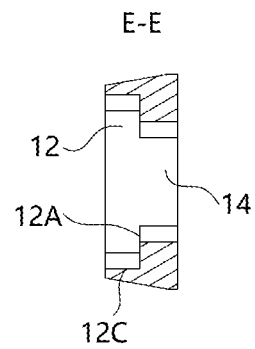

To improve the movement stability of the cover body 2, as shown in FIGS. 11A and 11B, two first side walls 12C of the accommodating portion 12 along the direction of movement of the cover body 2 are configured to provide guidance for the movement of the limiting portion 22; and/or two second side walls 142 of the opening 14 along the direction of movement of the cover body 2 are configured to provide guidance for the movement of the actuating portion 21.

In some embodiments, as the distance between the two first side walls 12C of the accommodating portion 12 is greater than that between the two second side walls 142 of the opening 14, the movement of the limiting portion 22 can be guided by the two first side walls 12C, and to make the movement of the cover body 2 smoother, the second side walls 142 are in clearance fit with the actuating portion 21.

This embodiment can provide guidance for the movement of the cover body 2, and may prevent shaking or clamping stagnation of the cover body 2 during the movement to ensure smooth movement of the cover body 2 and improve the stability of the cover body 2 in the movement, thereby smoothly implementing the secondary electrolyte injection. Moreover, it can also prevent shaking of the cover body 2 in the first position and improves the reliability of sealing the electrolyte.

Figure 12D:
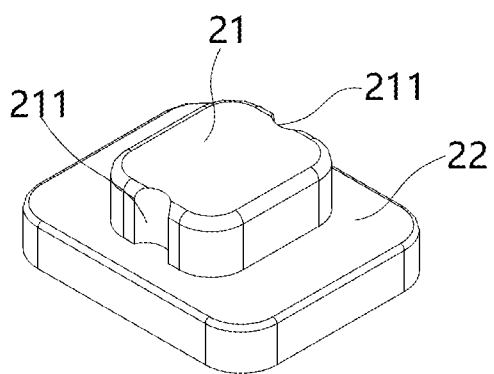
Figure 13A:
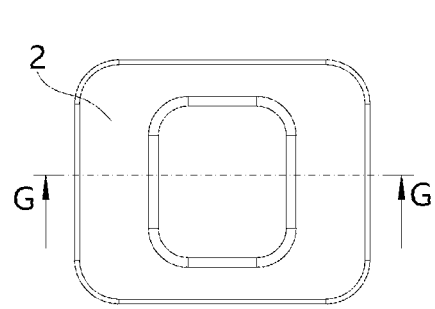
FIGS. 13A and 13B are a structural diagram and a G-G sectional view of a seal in the end cover assembly shown in FIG. 2 mounted to the cover body, respectively.
Figure 13B:
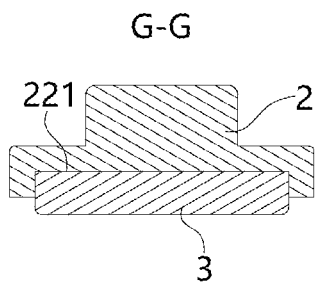
Figure 13C:
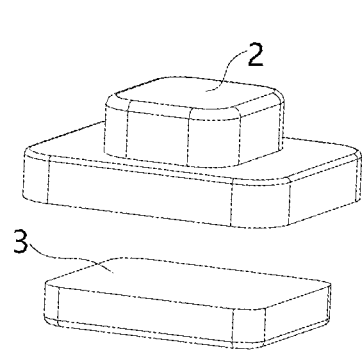
FIGS. 13C and 13D are an exploded view and an installation diagram of the seal and the cover body in the end cover assembly shown in FIG. 2, respectively.
Figure 13D:
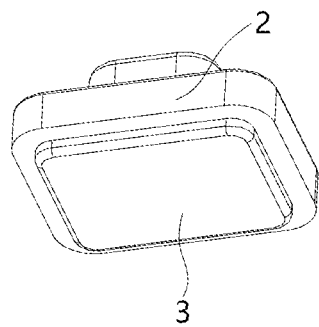

As shown in FIGS. 11A and 12D, a limiting structure is provided between a side wall of the opening 14 and the actuating portion 21, the limiting structure being configured to limit the cover body 2 to the first position. If the power consumption device generates a large vibration or impact during operation, the limiting structures can keep the cover body 2 reliably in the first position, and prevent the cover body 2 from deviating from the first position to cause electrolyte leakage, thereby improving the sealing performance for the electrolyte, thus ensuring the reliability of the operation of the battery cell 400.

As shown in FIGS. 11A and 12D, the limiting structures includes: a protruding portion 141 and a limiting opening 211. The protruding portion 141 is provided on a side wall of the opening 14 along the direction of movement of the cover body 2, and the limiting opening 211 is provided on a side wall of the actuating portion 21 along the direction of movement of the cover body 2, wherein the protruding portion 141 being configured to be snapped into the limiting opening 211 when the cover body 2 moves to the first position.

For example, the protruding portion 141 project toward the interior of the opening 14 relative to the side walls of the opening 14, and may be circular-arc-shaped; and the limiting openings 211 are recessed inward relative to the side walls of the cover body 2, may also be circular-arc-shaped. To enable the cover body 2 to smoothly reach the first position, transitional rounded corners may be provided at connections between the protruding portion 141 and the side walls of the opening 14 and at connections between the limiting openings 211 and the side walls of the cover body 2.

The arrangement of the accommodating portion 12 is described in detail below.

The accommodating portion 12 is at a preset distance from a face of the end cover 10' close to the interior of the housing 40 (i.e., an inner side face), and the size of the preset distance is not limited. For example, the accommodating portion 12 may be arranged in an upper region, a middle region, or a lower region of the end cover 10' such that at least part of the end cover 10' is located between the accommodating portion 12 and the electrode assembly 30, instead of providing the accommodating portion 12 directly on a bottom face of the end cover 10'.

The cover body 2 is rotated to achieve limitation with or separation from the accommodating portion 12, and during the rotation, friction may occur between the limiting portion 22 and the inner walls of the accommodating portion 12 to generate metal particles. As the accommodating portion 12 is located on a side of the end cover 10' away from the housing 40 in the present disclosure, the metal particles generated during the rotation do not fall directly into the housing 40 and cause a short circuit of the battery cell 400, thus further improving the safety of the battery cell 400.

Figure 10:
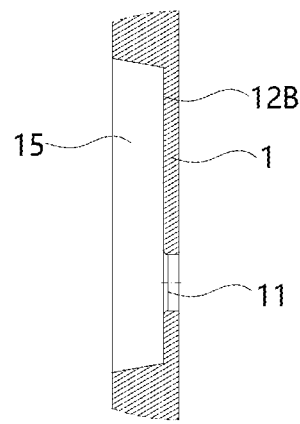
FIG. 10 is a structural diagram of the end cover assembly shown in FIG. 2 in which an end cover main body is provided with a first groove.

As shown in FIGS. 10 to 11B, the accommodating portion 12 includes a first limiting wall 12A, a second limiting wall 12B arranged opposite to the first limiting wall 12A, and a first side wall 12C configured to connect the first limiting wall 12A and the second limiting wall 12B.

When the cover body 2 is in a free state, the first limiting wall 12A abuts against the limiting portion 22, and there is a clearance between the second limiting wall 12B and the limiting portion 22.

For example, the first limiting wall 12A is a top wall that can limit the degree of freedom of upward movement of the cover body 2 in the height direction to restrict the cover body 2 from separating from the end cover 10'. The second limiting wall 12B is a bottom wall, and the second limiting wall 12B is at a preset distance from the inner surface of the end cover 10'.

When the cover body 2 needs to be moved, a downward acting force is applied to the cover body 2, and a clearance is generated between the limiting portion 22 and the first limiting wall 12A by deformation of the seal 3, and at that time, a driving force is applied to the cover body 2 so that the limiting portion 22 move smoothly along the accommodating portion 12. After reaching the first position, the cover body 2 is released, and the cover body 2 moves upward under the elastic action of the seal 3 until a top face of the limiting portion 22 abuts against the first limiting wall 12A, at which time a clearance may be formed between a bottom face of the limiting portion 22 and the second limiting wall 12B.

In this embodiment, not only can the cover body 2 be pressed down to reduce the resistance to movement when the cover body 2 is moving, and but also the cover body 2 can be released when the cover body 2 reaches the target position, so that the cover body 2 abuts against the first limiting wall 12A to limit the movement of the cover body 2.

Optionally, the second limiting wall 12B may also abut against the limiting portion 22. Similarly, to reduce resistance during the movement of the cover body 2, there may exist a clearance between the first side wall 12C and the limiting portion 22; optionally, the first side walls 12C may also be in contact with the limiting portion 22.

For the arrangement of the accommodating portion 12, as shown in FIGS. 10 to 11B, the end cover 10' includes an end cover main body 1 and a mounting component 4, the mounting component 4 being provided on a surface of the end cover main body 1, and the through hole 11 being arranged in the end cover 10' and located in an area formed by enclosure of the mounting component 4, and the accommodating portion 12 being formed by enclosure of the mounting component 4 and the end cover main body 1.

The end cover 10' is designed as a split structure in this embodiment. Since the end cover main body 1 is a thin plate-like structure that is not easy to machine into a complex structure, the mounting component 4 is provided to form the accommodating portion 12 easily, which can reduce the difficulty of machining the end cover main body 1. Furthermore, in assembly, firstly, the cover body 2 and seal 3 are placed on the second limiting wall 12B, and then the mounting component 4 is fixed to the end cover main body 1, whereby the cover body 2 can be restricted from separating from the end cover main body 1 by the mounting component 4.

As shown in FIGS. 12A to 12D, the limiting portion 22 is a rectangular block, and the actuating portion 21 is also a rectangular block and is at the center of the top of the limiting portion 22. As shown in FIGS. 11A to 11D, the accommodating portion 12 forms a rectangular groove as a whole, for example, the rectangular groove extending in the width direction of the end cover 10', and the opening 14 is also rectangular, and the size of the opening 14 in the width direction of the end cover 10' is the same as that of the accommodating portion 12. To reduce the stress at the accommodating portion 12 and the opening 14, rounded corners may be provided at all four corners of the rectangular groove.

This embodiment can maximize the size of the cover body 2 to apply a more uniform and stable compression force to the seal 3 through the cover body 2, which not only can improve the sealing effect, but also allows smoother movement of the cover body 2. Accordingly, the size of the actuating portion 21 may also be increased for ease of applying the driving force to improve the smoothness of the movement of the cover body 2.

Optionally, the accommodating portion 12 forms an elongated circular groove as a whole, and accordingly, the limiting portion 22 is circular.

As shown in FIG. 11B, the mounting component 4 includes a mounting loop 41 and two limiting tables 42. For example, the mounting loop 41 is a rectangular loop structure, and the two limiting tables 42 are respectively connected to inner side walls of the mounting loop 41 along the direction of movement of the cover body 2 and oppositely extend inwards; and the mounting loop 41 is fixed to the end cover main body 1, with the accommodating portion 12 being formed between the limiting tables 42 and the end cover main body 1, and a bottom face of the limiting tables 42 serving as the first limiting wall 12A.

As shown in FIGS. 6, 9 and 10, the end cover 10' includes an end cover main body 1 and a mounting component 4, an outer surface of the end cover main body 1 in the thickness direction being provided with a first groove 15, the mounting component 4 being fixed in the first groove 15, and the through hole 11 being arranged on a bottom wall of the first groove 15.

Such a structure can reduce the height of the mounting component 4 relative to the end cover main body 1 to reduce the height of the electrolyte injection member protruding from the end cover main body 1, thereby reducing the overall height of the battery cell 400, and it can also reduce the possibility of collision between the electrolyte injection member and other components during installation or use of the battery cell 400; secondly, in the case the battery cell 400 is applied to a battery, the reduced height of the mounting component 4 facilitates mounting other components above the end cover assembly 10, such as a detection circuit for acquiring signals from the battery cell 400.

As shown in FIG. 9, the height of the mounting component 4 is not higher than that of the first groove 15, and the height of the cover body 2 is not higher than that of the mounting component 4. Such configuration allows the electrolyte injection member not to protrude from the end cover main body 1.

Specifically, the mounting component 4 may be fixed in the first groove 15 in a variety of ways, such as by tight fit, bonding, installation by a fastener or welding. In the case of welding, side faces of the mounting component 4 mated with the first groove 15 are tapered, and radial dimensions of an open end of the first groove 15 are larger than radial dimensions of the bottom of the first groove 15, and mating surfaces of the mounting component 4 and the first groove 15 are welded by laser.

In this structure, the side wall of the first groove 15 is designed as tapered surfaces, which can achieve a guiding effect for the placement of the mounting component 4 into the first groove 15, and in the case of laser welding, there is no clearance in the laser incidence path, such that pores are not generated due to the clearance in the welding, and the structural strength of the welding is improved.

The arrangement of the seal 3 is described below.

In some embodiments, the seal 3 is fixed to the cover body 2, by means of bonding or a fastener, for example, such that when the cover body 2 moves, the seal 3 can reliably move synchronously with the cover body 2 and is not liable to separate therefrom, which can improve the sealing effect, and clamping stagnation is not liable to occur during the movement of the cover body 2.

In some other embodiments, the cover body 2 is in contact with the seal 3, a coefficient of friction between contact surfaces of the seal 3 and the cover body 2 being greater than a coefficient of friction between contact surfaces of the seal 3 and the end cover 10'.

As shown in FIG. 12B, a face of the limiting portion 22 facing the seal 3 is provided with a second groove 221, and at least part of the seal 3 is located in the second groove 221. Side wall of the second groove 221 serve as constraints on the seal 3, to ensure that during the movement of the cover body 2, the seal 3 moves synchronously with the cover body 2 and does not separate therefrom.

For example, the limiting portion 22 is rectangular, the seal 3 is also rectangular and provided with four rounded corners to form a sealing gasket, and the second groove 221 is a rectangular groove. As shown in FIGS. 13A to 13D, the seal 3 is arranged in the second groove 221 and partially protrudes from the bottom face of the limiting portion 22 to achieve a good sealing effect by compression of the seal 3.

The assembly of the end cover assembly 10 of the first embodiment and a secondary electrolyte injection mode thereof are described below in conjunction with FIGS. 2 to 13D.

During assembly of the end cover assembly 10: firstly, the seal 3 is fixed in the second groove 221 of the cover body 2, and together placed into an area of the mounting component 4 for forming the accommodating portion 12, such that the actuating portion 21 is located in the opening 14. Next, the mounting component 4 is placed into the first groove 15, and the mounting component 4 is fixed to the end cover main body 1 by means of welding or the like.

When electrolyte injection is needed, a tooling component is clamped on the actuating portion 21 to drive the cover body 2 to move in the extension direction of the accommodating portion 12, and as shown in FIG. 9, when the cover body 2 moves to a position where the limiting portion 22 abuts against one end of the accommodating portion 12 in the extension direction, i.e., reaching the second limit position, the cover body 2 and the seal 3 avoid the through hole 11, and in this state the electrolyte can be injected via the through hole 11.

After the electrolyte injection is completed, the tooling component is clamped on the actuating portion 21 to drive the cover body 2 to move oppositely in the extension direction of the accommodating portion 12, and as shown in FIG. 6, when the cover body 2 moves to a position where the limiting portion 22 abuts against the other end of the accommodating portion 12 in the extension direction, i.e., reaching the first limit position, the cover body 2 and the seal 3 cover the through hole 11, thereby sealing the through hole 11.

FIGS. 15 to 20B are structural diagrams of an end cover assembly 10 of a second embodiment of the present disclosure.

Figure 15:
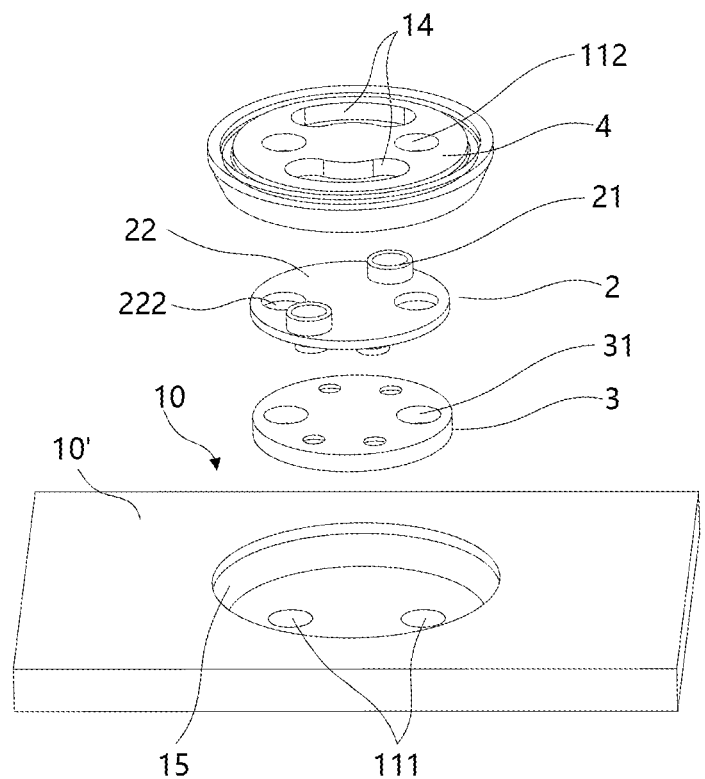
FIG. 15 is an exploded view of a second embodiment of an end cover assembly in the battery cell in the present disclosure.
Figure 16A:
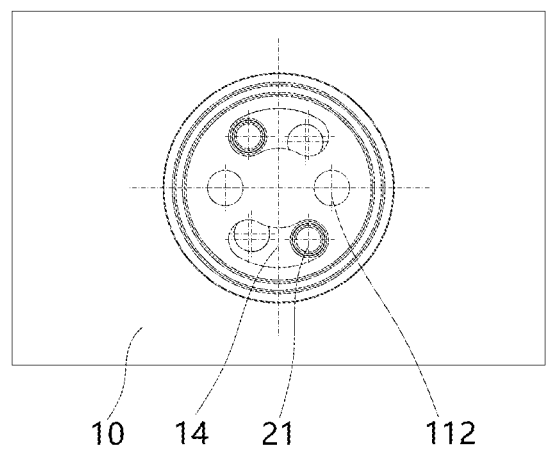
FIGS. 16A and 16B are state diagrams of a cover body in the end cover assembly shown FIG. 15 in a first position and in a second position, respectively.
Figure 16B:
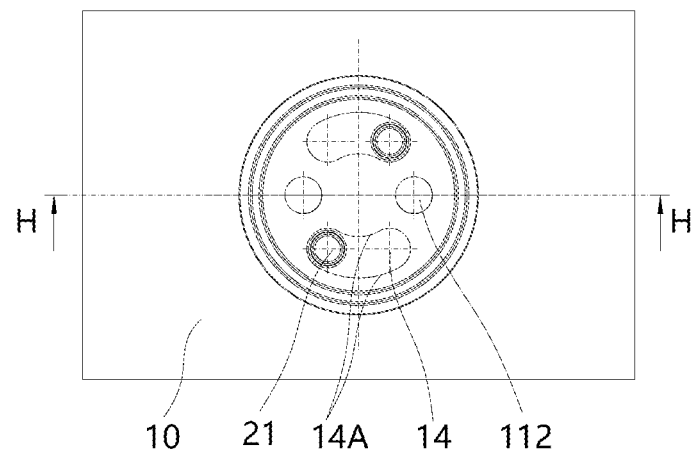
Figure 17:
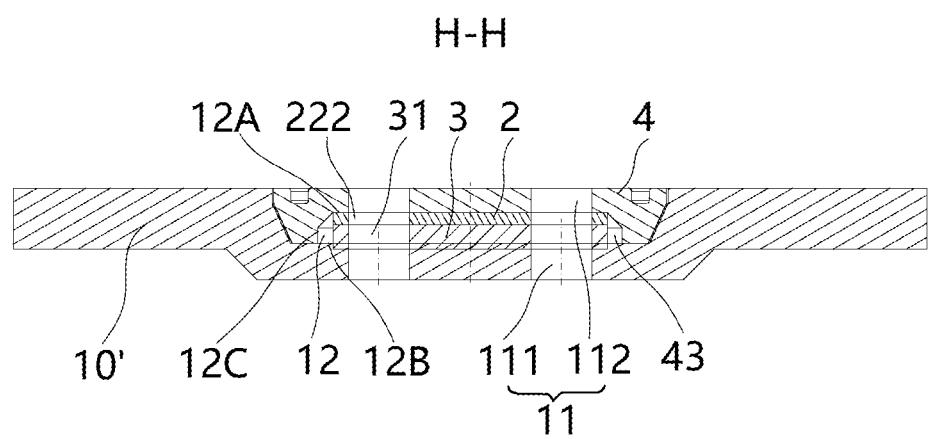
FIG. 17 is an H-H sectional view of the end cover assembly shown in FIG. 16B.

As shown in FIGS. 15 to 17, the cover body 2 is to configured to rotate around a center of the accommodating portion 12 to reach the first position and the second position. The through hole 11 is located in an area where the accommodating portion 12 is located. During the rotation, the location of the seal 3 remains the same, and only its circumferential angular position is changed.

This embodiment implements the opening or closing of the through hole 11 by rotating the cover body 2, which eliminates the need to provide additional space for the movement of the cover body 2 compared to the embodiment of moving the cover body 2, and switching between the first position and the second position can be achieved by rotating about its center without changing the area where the cover body 2 is located, which is favorable for increasing the size of the cover body 2 and facilitates the application of a stable driving force, and accordingly is favorable for increasing the size of the seal 3 to achieve a better sealing effect. In addition, the location of the seal 3 does not change during the rotation, and local uneven deformation does not occur during the movement, which ensures that the cover body 2 can move smoothly.

As shown in FIG. 15, the through hole 11 is arranged off the center of the accommodating portion 12, such that the shield state of the through hole 11 by the seal 3 can be controlled when the cover body 2 is rotated.

In the second embodiment, the accommodating portion 12 is formed by the following structure.

As shown in FIG. 17, the end cover 10' includes an end cover main body 1 and a mounting component 4, an outer surface of the end cover main body 1 in the thickness direction being provided with a first groove 15, the mounting component 4 being fixed in the first groove 15. The mounting component 4 is disc-shaped, and the first groove 15 is also circular. A third groove 43 is provided on a face of the mounting component 4 facing toward the bottom wall of the first groove 15, and an accommodating portion 12 is formed between the third groove 43 and the bottom wall of the first groove 15, and the seal 3 and the limiting portion 22 are superimposed in the accommodating portion 12.

As shown in FIGS. 15 and 17, the through hole 11 includes a first through hole segment 111 and a second through hole segment 112 that are provided coaxially, the first through hole segment 111 being formed in the bottom wall of the first groove 15, and the second through hole segment 112 being formed in the mounting component 4, i.e. formed on a bottom wall of the third groove 43.

As shown in FIGS. 15 and 16B, the seal 3 is provided with a first avoidance hole 31, and the limiting portion 22 is provided with a second avoidance hole 222, and when the cover body 2 is rotated to the second position, the first through hole segment 111, the first avoidance hole 31, the second avoidance hole 222 and the second through hole segment 112 are aligned, and the first through hole segment 111 is communicated with the second through hole segment 112 through the first avoidance hole 31 and the second avoidance hole 222, and electrolyte injection can be performed in this state.

As shown in FIG. 16A, when the cover body 2 is rotated counterclockwise by a preset angle to the first position, the first avoidance hole 31 and the second avoidance hole 222 are in an area where the opening 14 is located, and the first through hole segment 111 is separated from the second through hole segment 112 by the limiting portion 22 and the seal 3, and sealing of the first through hole segment 111 is achieved in this state.

To facilitate the application of a driving force to rotate the cover body 2, as shown in FIG. 18, the mounting component 4 is provided with an opening 14. The opening 14 is an elongated circular hole in a circular arc shape, and the opening 14 is communicated with both the accommodating portion 12 and the outer side of the end cover 10'. As shown in FIG. 20A, the cover body 2 further includes an actuating portion 21. The actuating portion 21 is arranged on the top of the limiting portion 22 and movable in the opening 14, and configured to receive an external driving force to cause the cover body 2 to move. For example, the opening 14 may be located near the periphery of the mounting component 4, and the actuating portion 21 may be a cylindrical boss.

With the actuating portion 21 in this embodiment, the external force can be applied conveniently to drive the cover body 2 to move, and the applied external force can be more balanced so that the cover body 2 moves smoothly along the accommodating portion 12 to avoid clamping stagnation.

To facilitate the application of the driving force to the actuating portion 21, as shown in FIG. 20A, the top of the actuating portion 21 is provided with a clamping groove 212 configured to cooperate with an external component for applying the driving force, to drive the cover body 2 to move. For example, the clamping groove 212 may be a round hole. Such a structure facilitates nested clamping of a tooling component embedded in the clamping groove 212 to drive the cover body 2 to move.

As shown in FIGS. 16A and 16B, the first position and the second position are a first limit position and a second limit position, respectively, for the movement of the cover body 2 in opposite directions. Such a structure can reduce the extension length of the opening 14, thus ensuring the structural strength of the mounting component 4.

As shown in FIGS. 16A and 16B, two ends of the opening 14 in the circumferential direction cooperate with the actuating portions 21 to define the first limit position and the second limit position, respectively. Such a structure can limit the movement stroke of the cover body 2 by a simple structure, and enables the cover body 2 to reach the first position or the second position accurately.

As shown in FIGS. 16A and 16B, two second side walls 142 of the opening 14 are configured to provide guidance for the movement of the actuating portion 21. Such a structure can prevent shaking or clamping stagnation of the cover body 2 during the rotation to ensure smooth rotation of the cover body 2 and improve the stability of the cover body 2 in the rotation, thereby smoothly implementing the secondary electrolyte injection. Moreover, it can also prevent shaking of the cover body 2 in the first position and improves the reliability of sealing the electrolyte.

As shown in FIGS. 15 and 18, at least two, for example, two through holes 11 are arranged circumferentially of the accommodating portion 12, and the openings 14 are located circumferentially between adjacent two through holes 11; one opening 14 may be provided, or two openings 14 are provided to facilitate guiding the cover body 2 to rotate smoothly, and the two openings 14 are located on two sides of the through holes 11 and opposite to each other.

Accordingly, as shown in FIG. 19, at least two first avoidance holes 31 are provided, and the position relationship between the at least two first avoidance holes 31 is the same as the position relationship between the plurality of second through hole segments 112 in the mounting component 4.

As shown in FIGS. 20A and 20B, at least two second avoidance holes 222 are also provided, and the position relationship between the at least two second avoidance holes 222 is the same as the position relationship between the plurality of second through hole segments 112 in the mounting component 4.

In this embodiment, with the at least two through holes 11 provided circumferentially off the center of the accommodating portion 12, the efficiency of electrolyte injection can be improved, and the gas inside the housing 40 are easier to release.

In this embodiment, the seal 3 may be fixed to the limiting portion 22 in a variety of ways, such as by means of bonding or connection by a fastener. As shown in FIG. 19, the seal 3 is provided with a plurality of fixing holes 32. For example, four fixing holes 32 may be provided. As shown in FIG. 20B, a plurality of inverted buckles 223 are provided on a face of the limiting portion 22 away from the actuating portion 21, and the inverted buckles 223 are embedded in the fixing holes 32 to achieve fixation of the seal 3 to the cover body 2. Such a structure can improve the reliability of fixation of the seal 3 to the cover body 2, thereby improving the sealing performance.

The assembly of the end cover assembly 10 of the second embodiment and a secondary electrolyte injection mode thereof are described below in conjunction with FIGS. 15 to 20B.

During assembly of the end cover assembly 10: firstly, the seal 3 is fixed to the cover body 2 and together placed into the third groove 43 in the mounting component 4, such that the two actuating portions 21 are respectively located in the two openings 14. Next, the mounting component 4 is placed into the first groove 15, and the mounting component 4 is fixed to the end cover main body 1 by means of welding or the like.

When electrolyte injection is needed, the tooling component is inserted into the clamping grooves 212 to drive the cover body 2 into rotation, and as shown in FIG. 16B, when the rotation reaches a position where the actuating portions 21 abut against one ends of the openings 14, i.e., reaching the second limit position, the first through hole segments 111 are communicated with the second through hole segments 112 through the first avoidance holes 31 and the second avoidance holes 222, and in this state, electrolyte injection can be performed via the two sets of through holes 11.

After the electrolyte injection is completed, the tooling component is inserted into the clamping grooves 212 to drive the cover body 2 to move, and as shown in FIG. 16A, when the rotation reaches a position where the actuating portions 21 abut against the other ends of the openings 14, i.e., reaching the first limit position, the first through hole segments 111 are separated from the second through hole segments 112 by the seal 3 and the limiting portion 22, thereby sealing first through hole segments 111.

In addition to the above description for the second embodiment alone, other structures and cooperating relationships for the accommodating portion 12, the cover body 2, the seal 3, etc. in the first embodiment may also be applied to the second embodiment and will not be repeated here.

Second, based on the improvements of the above embodiments for the end cover assembly 10, the present disclosure also provides a housing assembly 410 for a battery cell 400. In some embodiments, as shown in FIG. 21, the housing assembly 410 includes a housing 40, a seal 3, and a cover body 2.

A side wall of the housing 40 is provided with a through hole 11 for injecting an electrolyte and an accommodating portion 12. The seal 3 is configured to seal the through hole 11. The cover body 2 is configured to cover at least part of the seal 3 and is movable together with the seal 3. The cover body 2 includes a limiting portion 22. The limiting portion 22 is located in the accommodating portion 12 to restrict the cover body 2 from separating from the housing 40. The cover body 2 is configured to move relative to the housing 40 by movement of the limiting portion 22 relative to the accommodating portion 12, When the cover body 2 moves to a first position, the seal 3 covers the through hole 11; and when the cover body 2 moves to a second position, the seal 3 avoids the through hole 11.

In this embodiment, the through hole 11 may be provided on any wall face of the housing 40. As shown in FIG. 1D, as the lithium battery has a small volume, and the terminals 5 and pressure relief component 6 are provided on the end cover main body 1, or in some other structures an end cover temperature collecting structure is also provided thereon, the remaining area on the end cover main body 1 is small, and if the through hole 11 is provided on any other face of the housing 40, it allows increasing the size of the electrolyte injection component to further improve the structural strength and improve the reliability of enclosing the electrolyte in a vibrating working environment, and this is also convenient for the movement of the cover body 2.

This embodiment can implement secondary electrolyte injection by changing the locations of the cover body 2 and the seal 3. Through convenient secondary electrolyte injection, the present disclosure can effectively slow down cell capacity reduction and improve the service life of the battery cell 400. Moreover, in the secondary electrolyte injection, the cover body 2 and the seal 3 do not need to be removed from the housing 40, thus omitting steps of removing and mounting the cover body 2 and the seal 3 during the secondary electrolyte injection, making it easier to operate, and this can avoid the loss of parts, improve the assembly efficiency of the battery cell 400 during manufacture, and shorten the maintenance time during the secondary electrolyte injection.

For an embodiment in which an electrolyte injection member is provided on a side wall of the housing 40, reference may be made to the previous embodiments in which an electrolyte injection member is provided on the end cover 10', and this will not be repeated here.

Based on the above embodiment, as shown in FIG. 1E, the battery cell 400 of the present disclosure may include: an electrode assembly 30 and a casing 410' for accommodating the electrode assembly 30, the casing 410' including a housing 40 and the end cover assembly 10 of the above embodiments, the housing 40 having an end opening, and the end cover assembly 10 covering the end opening of the housing 40; or, as shown in FIG. 21, an electrode assembly 30 and a casing 410' for accommodating the electrode assembly 30, the casing 410' including an end cover main body 1 and the housing assembly 410 of the above embodiments, the housing 40 having an end opening, and the end cover main body 1 covering the end opening of the housing 40.

Figure 22:
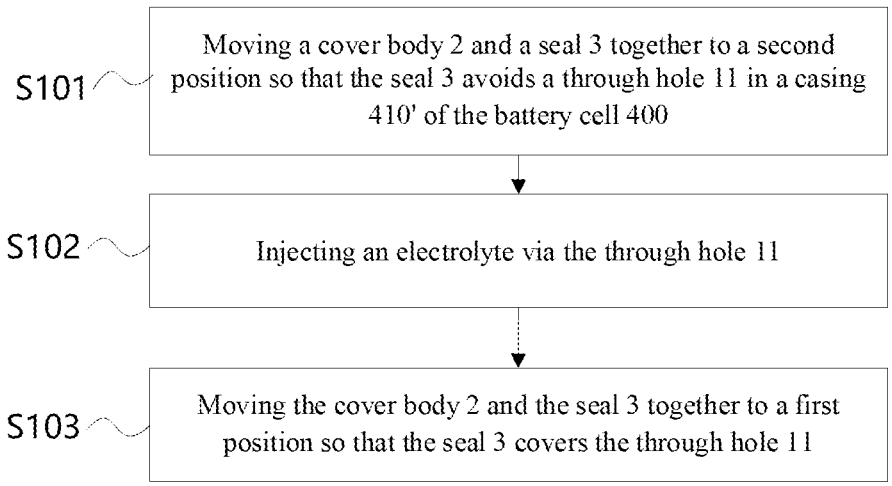
FIG. 22 is a flow diagram of some embodiments of an electrolyte injection method for a battery cell in the present disclosure.

Again, the present disclosure also provides an electrolyte injection method for a battery cell 400, which may be based on the battery cell 400 of the above embodiments. In some embodiments, as shown in a flow diagram in FIG. 22, the electrolyte injection method includes:

step S101, moving a cover body 2 and a seal 3 together to a second position so that the seal 3 avoids a through hole 11 in a casing 410' of the battery cell 400;

step S102, injecting an electrolyte via the through hole 11; and step S103, moving the cover body 2 and the seal 3 together to a first position so that the seal 3 covers the through hole 11, wherein during the movement of the cover body 2, a limiting portion 22 of the cover body 2 moves in an accommodating portion 12 of the casing 410' and restricts the cover body 2 from separating from the casing 410'.

Compared with the traditional way of closing an electrolyte injection hole by laser welding, the present disclosure not only avoids the process of welding, but also avoids a plurality of subsequent steps of cleaning welding slag resulting from welding and drying a liquid residue from the cleaning. Therefore, the present disclosure improves the production efficiency of the battery cell 400. The present disclosure implements the opening and closing of the through hole 11 by the movement of the cover body 2 without removing the cover body 2 and the seal 3, which is simple and fast, and can improve the assembly efficiency of the electrolyte injection member during the assembly of the battery cell 400, thus further improving the production efficiency of the battery cell 400.

Finally, the present disclosure also provides an electrolyte injection device 500 for injecting an electrolyte to a battery cell 400. The device can be used to implement the electrolyte injection method described above.

Figure 23:
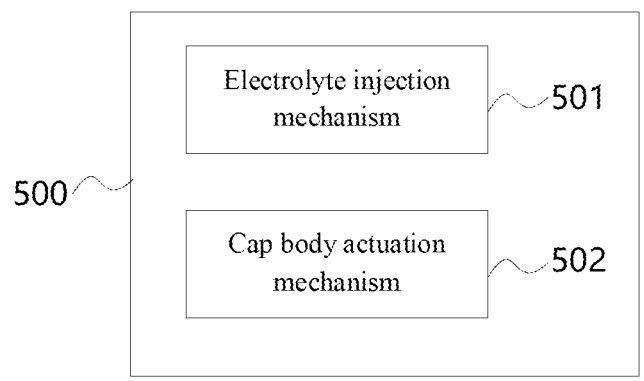
FIG. 23 is a composition diagram of some embodiments of an electrolyte injection device in the present disclosure.

In some embodiments, as shown in FIG. 23, the electrolyte injection device 500 includes: an electrolyte injection mechanism 501 configured to inject the electrolyte into a casing 410' of the battery cell 400 via a through hole 11 provided in the casing 410'; and a cover body actuation mechanism 502 configured to apply a driving force to a cover body 2 so that the cover body 2 and a seal 3 move together to a first position to cover the through hole 11 or the cover body 2 and the seal 3 move together to a second position to avoid the through hole 11. During the movement of the cover body 2, a limiting portion 22 of the cover body 2 moves in an accommodating portion 12 of the casing 410' and restricts the cover body 2 from separating from the casing 410'.

Compared with the traditional way of closing an electrolyte injection hole by laser welding, the present disclosure not only avoids the process of welding, but also avoids a plurality of steps of cleaning welding slag resulting from welding and drying a liquid residue from the cleaning. The device can achieve simple and efficient manufacture of the battery cell 400, thereby increasing the assembly efficiency of the battery cell 400.

Although the present disclosure has been described with reference to preferred embodiments, various improvements can be made thereto without departing from the scope of the present disclosure, and components thereof can be replaced with equivalents. In particular, the various technical features mentioned in the various embodiments can be combined in any way, so long as there is no structural conflict. The present disclosure is not limited to the particular embodiments disclosed herein, but includes all technical solutions that fall within the scope of the claims.

What is claimed is:

1. An end cover assembly for a battery cell, comprising:
   an end cover comprising a through hole for injecting an electrolyte and an accommodating portion;
   a seal configured to seal the through hole; and
   a cover body covering at least part of the seal and being movable together with the seal, the cover body comprising a limiting portion, and the cover body being configured to move relative to the end cover through the movement of the limiting portion in the accommodating portion,
   wherein when the cover body moves to a first position, the seal covers the through hole,
   wherein when the cover body moves to a second position, the seal avoids the through hole, and
   wherein in the first position and the second position, the limiting portion is located in the accommodating portion to restrict the cover body from separating from the end cover.

2. The end cover assembly according to claim 1, wherein the first position and the second position are a first limit position and a second limit position, respectively, for the movement of the cover body in opposite directions.

3. The end cover assembly according to claim 1, wherein the end cover is provided with an opening communicated with the accommodating portion, and
   wherein the cover body further comprises an actuating portion connected to the limiting portion, the actuating portion being configured to move in the opening by receiving an external driving force.

4. The end cover assembly according to claim 3, wherein the actuating portion passes through the opening toward an outer side of the end cover in a thickness direction.

5. The end cover assembly according to claim 3, wherein two side walls of the accommodating portion along a direction of movement of the cover body are configured to provide guidance for the movement of the limiting portion, and/or
   wherein two side walls of the opening along a direction of movement of the cover body are configured to provide guidance for the movement of the actuating portion.

6. The end cover assembly according to claim 3, wherein the first position and the second position are a first limit position and a second limit position, respectively, for the movement of the cover body in opposite directions,
   wherein two ends of the accommodating portion along a direction of movement of the cover body cooperate with the limiting portion to define the first limit position and the second limit position, respectively, and/or
   wherein two ends of the opening along a direction of movement of the cover body cooperate with the actuating portion to define the first limit position and the second limit position, respectively.

7. The end cover assembly according to claim 3, wherein a limiting structure is provided between a side wall of the opening and the actuating portion, the limiting structure being configured to limit the cover body to the first position.

8. The end cover assembly according to claim 3, wherein the actuating portion is provided with a clamping groove configured to cooperate with an external component for applying a driving force, so as to drive the cover body to move.

9. The end cover assembly according to claim 1, wherein the accommodating portion comprises a first limiting wall, a second limiting wall arranged opposite to the first limiting wall, and a first side wall connecting the first limiting wall and the second limiting wall.

10. The end cover assembly according to claim 1, wherein the end cover comprises an end cover main body and a mounting component, the mounting component being provided on a surface of the end cover main body,
    wherein the through hole is arranged in the end cover and located in an area formed by enclosure of the mounting component, and
    wherein the accommodating portion is formed by enclosure of the mounting component and the end cover main body.

11. The end cover assembly according to claim 1, wherein the cover body is configured to move in an extension direction of the accommodating portion to reach the first position and the second position.

12. The end cover assembly according to claim 11, wherein the through hole is arranged off the center of the accommodating portion in the extension direction.

13. The end cover assembly according to claim 11, wherein the end cover comprises an end cover main body and a mounting component,
    wherein an outer surface of the end cover main body in a thickness direction is provided with a first groove, the mounting component being fixed in the first groove, and
    wherein the through hole is arranged on a bottom wall of the first groove.

14. The end cover assembly according to claim 1, wherein the cover body is configured to rotate around a center of the accommodating portion to reach the first position and the second position.

15. The end cover assembly according to claim 14, wherein the through hole is arranged off the center of the accommodating portion.

16. The end cover assembly according to claim 14, wherein the end cover comprises an end cover main body and a mounting component,
    wherein an outer surface of the end cover main body in a thickness direction is provided with a first groove, the mounting component being fixed in the first groove,
    wherein the through hole comprises a first through hole segment and a second through hole segment that are provided coaxially, the first through hole segment being formed on a bottom wall of the first groove and the second through hole segment being formed in the mounting component, and
    wherein the seal is provided with a first avoidance hole, and the limiting portion is provided with a second avoidance hole, the first through hole segment being communicated with the second through hole segment through the first avoidance hole and the second avoidance hole when the cover body moves to the second position.

17. The end cover assembly according to claim 14, wherein the end cover is provided with an opening communicated with the accommodating portion, and the cover body further comprises an actuating portion, the actuating portion being connected to the limiting portion and movable in the opening, and configured to receive an external driving force to cause the cover body to move, and wherein at least two through holes are provided circumferentially of the accommodating portion, and the opening is located circumferentially between adjacent two through holes.

18. A battery cell, comprising:

an electrode assembly and a casing for accommodating the electrode assembly, the casing comprising a housing and the end cover assembly according to claim 1, the housing having an end opening, and the end cover assembly covering the end opening of the housing.

19. A battery, comprising a plurality of battery cells according to claim 18.

20. A power consumption device, comprising the battery cell according to claim 18, wherein the battery cell is configured to provide electrical energy.

* * * * *